Jan. 12, 1971 P. FOMBONNE 3,555,458

SIDE BAND GENERATOR

Filed Nov. 13, 1967 2 Sheets-Sheet 2

United States Patent Office 3,555,458

Patented Jan. 12, 1971

3,555,458

SIDE BAND GENERATOR

Paul Fombonne, Paris, France, assignor to CSF-Compagnie Generale de Telegraphie Sans Fil, a corporation of France Filed Nov. 13, 1967, Ser. No. 682,243
Claims priority, application France, Nov. 24, 1966, 84,857
Int. Cl. H03c *1/52*
U.S. Cl. 332—44 3 Claims

ABSTRACT OF THE DISCLOSURE

A side band generator providing two pairs of side bands in quadrature and comprising two phase shifters which are variable and controlled in a digital manner, and which phase shift, simultaneously and in opposite directions, each half of the energy of the high frequency wave carrier, the phase shift reaching $2\pi$ at the end of a period of the low frequency modulating wave.

The present invention relates to side-band generators, of the type receiving a high frequency wave with a frequency $f$ and a low frequency wave with a frequency F, and supplying two frequencies $f+F$ and $f-F$, which are the side bands which would appear if the high frequency wave were amplitude modulated at the frequency F.

In certain applications of such generators for example in the ILS system, it may be useful to have at ones' disposal two pairs of side band waves whose modulating signals are in quadrature, i.e.:

$$\cos(2\pi ft+\varphi)\sin(2\pi Ft)$$
and
$$\cos(2\pi ft+\varphi)\cos(2\pi Ft) \quad (1)$$

Known side band generators generally multiply by each other the two signals represented respectively by each of the expressions (1). Such generators generally supply only a single one of above waves.

It is an object of this invention to provide a side band generator having a particularly simple structure and yet simultaneously providing the two waves (1).

According to the invention, there is provided an arrangement for providing a first pair of side-band waves and a second pair of side-band waves corresponding to the amplitude modulations at a frequency F of a wave at a frequency $f$, the modulating signal of said first pair being in quadrature with respect to the modulating signal of said second pair, said arrangement comprising: means for providing high frequency carrier wave energy at said frequency $f$, means for splitting said energy into two equal parts; first and second means for respectively, simultaneously and stepwise, phase shifting said energy part by equal steps of opposite sine, said steps having the same absolute value for both energy parts, said phase-shifts reaching the value $2\pi$ within a period T equal to $1/F$, said first and second means having respective outputs; and adding and subtracting means having inputs respectively coupled to said outputs, said adding and subtracting means having a sum and a difference output.

For a better understanding of the invention and to show how the same may be carried into effect, reference will be made to the drawings accompanying the following description and in which.

The same reference numerals designate the same elements in all figures.

Figure 1:
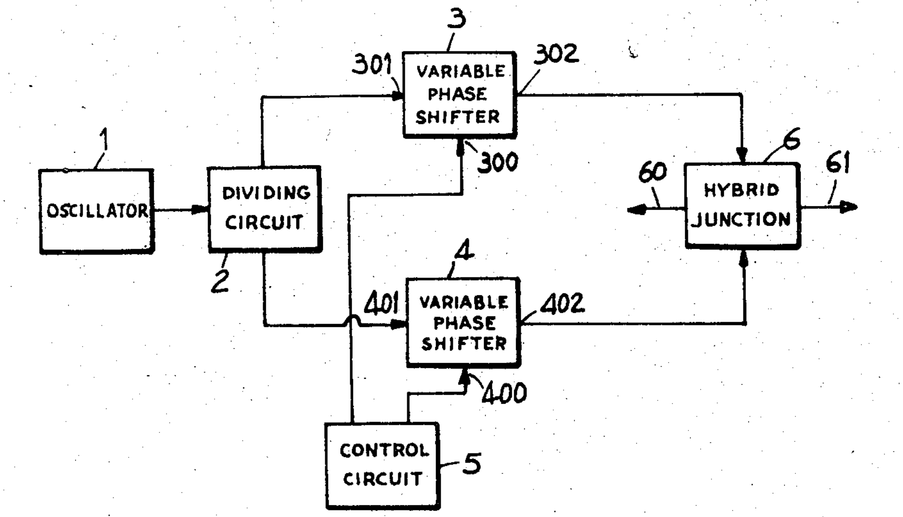
FIG. 1 shows a block diagram of a side-band generator according to the invention.

According to the block-diagram of FIG. 1, an oscillator 1 supplies a sinusoidal high frequency wave with a frequency $f$. The energy supplied by oscillator 1 is divided into two equal parts by a dividing circuit 2, for example a hybrid junction. These two parts of the energy are fed, respectively, to inputs 301 and 401 of two identical variable phase-shifter circuits 3 and 4 with a digital control. The control inputs 300 and 400 of these phase-shifters are connected to a control circuit 5. The outputs 302 and 402 of the phase-shifters 3 and 4 are connected to two inputs of a hybrid junction 6, whose output 61 supplies the sum and whose output 60 supplies the difference of the waves applied to the inputs of the junction 6.

The operation of this assembly will be explained with particular reference to FIG. 2.

Figure 2:
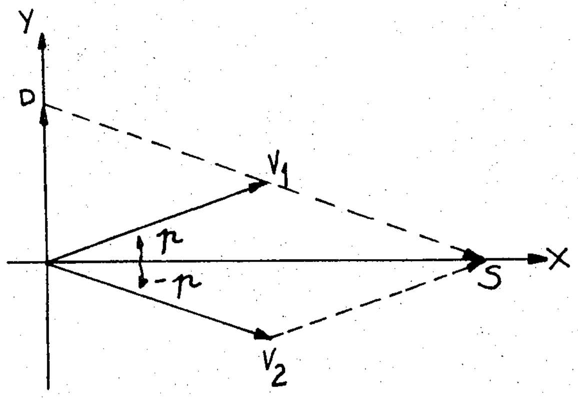
FIG. 2 is an explanatory drawing using Fresnel's representation.

If two waves with the same frequency $f$ and with the same amplitude, as shown in FIG. 2 by the vectors $V_1$ and $V_2$, undergo variable, equal and opposite phase-shifts $+p$ and $-p$ and if the phase-shift is varied according to the law $p=2\pi Ft$, the vectors $V_1$ and $V_2$ will turn in the opposite directions at the angular velocity $2\pi F$. They represent two waves with the frequencies $f+F$ and $f-F$ which are the required side bands. Indeed, if the amplitude of the vectors $V_1$ and $V_2$ is taken as unity, the sum S and the difference D of the vectors $V_1$ and $V_2$ can be written as follows:

$$S=2\cos(2\pi Ft)$$
$$D=2\sin(2\pi Ft) \quad (2)$$

The expressions (2) are thus equal, within a factor equal to $1/2\cos(2\pi ft+\varphi)$, to the expressions (1) and the sum S and the difference D do represent two pairs of side bands in quadrature.

Since the phase-shifts $p$ are defined only within $2m\pi$, where $m$ is an integer, the linear law $p=2\pi FT$ can be replaced by a sawtooth law, where $p$ varies linearly within each period and resumes its original zero value every time $t$ is equal to $mT$. The phase-shifters 3 and 4 are controlled to achieve this effect, and the outputs 61 and 60 of the junction 6, supply then the two pairs of side-bands, defined by the relations (2).

Figure 3:
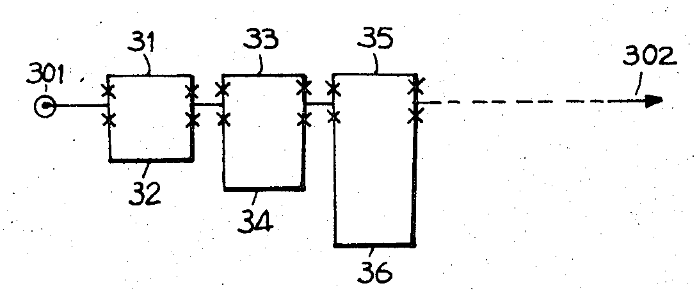
FIG. 3 shows a diagram of one embodiment of the phase-shifter used in a generator according to the invention.

FIG. 3 shows diagrammatically an embodiment of a phase-shifter, namely the phase-shifter 3. The same is formed by pairs of transmission line sections in parallel, connected in series, all sections having the same characteristics impedance: each elementary phase-shifting element comprises two parallel lines 31 and 32, 33 and 34. The signal applied to the input 301 can flow through either of the lines building up each phase-shifter element. The switching in of a derivation and the de-energizing of the other are ensured by switching diodes, indicated diagrammatically by crosses. These diodes can be mounted in series with the transmission lines or, as shown in FIG. 4 for the element 31–32, in parallel at a quarter wavelength of the circuit nodes.

Figure 4A:
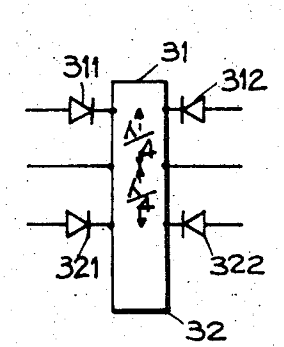
FIG. 4 shows two possible embodiments of a detail of the phase-shifter of FIG. 3.
Figure 4B:
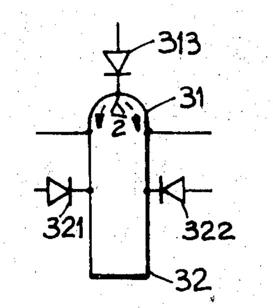

In FIG. 4*a*, the diodes 311 and 312 are, for example, rendered conducting to prevent thereby the passage of the signal into the derivation 31, whilst the diodes 321 and 322 are blocked. For the derivations 31, 33, 35 . . . which will be called "short" derivations, transmission lines with the same length equal to a half-wave length and a single diode 313 located at the middle of the line are preferably used. Thus all "short" lines 31, 33, 35 . . . have the same length. The derivations 32, 34, 36 . . . the so-called "long" derivations, have increasing lengths, so that the additional phase-shift introduced thereby when it is switched in instead of the "short" line, is equal to $2^{i-1}q$ for the $i$th derivation, where $q$ is the additional phase-shift introduced by the first "long" derivation 32.

If N is the number of derivations, it is thus possible to realize $2^N$ quantified phase-shifts, inclusive of that corresponding to the short line path.

The $2^N$ phase-shifts form a sequence: 0, $q$, $2q$ . . . $2^{N\ 1}q$.

The phase-shift $q$ is so selected that the phase-shift value $2^Nq$, has a value $2\pi$, which is equivalent to a zero phase-shift.

The arrangement just described makes it possible to simulate the phase-shift following a sawtooth pattern. with $p=\pm 2\pi Ft$ as defined above. To this end, the phase-shifters 3 and 4 are, respectively, controlled so as to provide phase-shifts:

$$0, q \ldots (2^{N-1})q$$

and $$(2^{N-1})\, q \ldots q, 0$$

by realizing during time intervals $T/2^N$ each of the successive phase-shifts, with return to the initial state 0 or $2^{N-1}q$ after a complete cycle.

Figure 5:
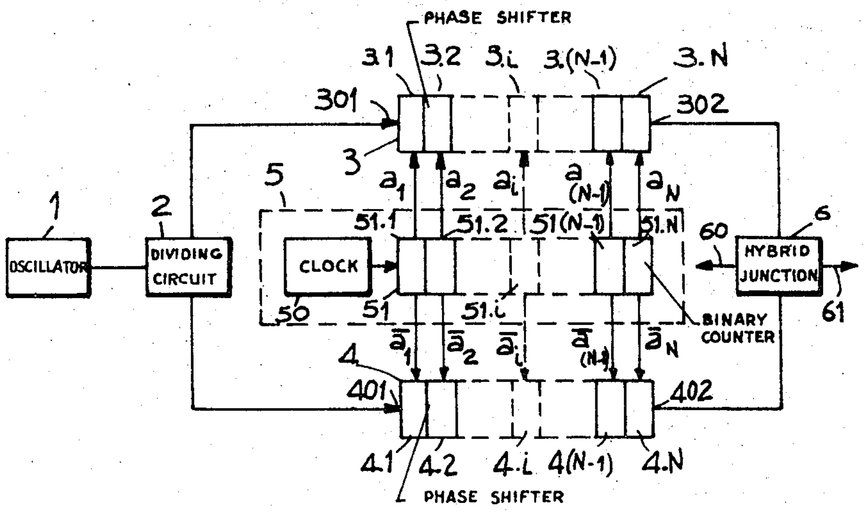
FIG. 5 shows in more detail the diagram of one embodiment of a side band generator according to the invention.

Since it is not necessary for the waves passed by the phase-shifters 3 and 4 to be in phase in the initial state, the simplified arrangement of FIG. 5 may be used.

In this embodiment, the control circuit 5 comprises a clock 50 suplying pulses at the frequency $2^NF$ to a binary counter 51 with N outputs 51.1 to 51.N. Every output is twofold and supplies, the binary digit $a_i$ and its complement $\overline{ai}$. Each phase-shifter element 3.$i$ of the phase-shifter 3 is controlled by the binary digit $a_i$, whilst each element 4.$i$ of the phase-shifter 4 is controlled by the binary digit $\overline{a_1}$; and the "long" derivation of each phase-shifter element is switched in when the binary digit controlling it has the value 1. In the initial state, the state of the phase-shifter 3 is represented by the binary number 000 . . . . . 0 and the state of the phase-shifter 4 by the binary number 111 . . . . . 1. There exists therefore an initial phase-shif equal to $q$ between the two waves supplied by the phase-shifters 3 and 4. The phase-shifts applied by the phase-shifters 3 and 4 vary simultaneously in opposite direction by steps equal to $q$ according as the count of the counter 51 rises.

When $2^N$ pulses have been counted, the initial state occurs again, whilst the vectors representing the waves supplied by the phase-shifters 3 and 4 have turned simultaneously in opposite directions through $2\pi$ which is the required result, since this rotation has been effected during the period of time $T=1F$.

Since the phase-shifts do not vary continuously, a parasitic modulation is superimposed over the useful modulation at the frequency F. The decomposition into the Fourier series shows easily that the minimum parasitic frequency is equal $2^{N-1}$F and that the distortion is small.

In the special case of ILS transmitters, where the frequency $f$ is located in the VHF or UHF bands and where the frequency F is equal to 90 or 150 c./s. it is sufficient to select N higher than 6 in order to reject the parasitic frequencies above 6 kc./s., that is to say, outside the low frequency pass band of navigational receivers.

An important advantage of the side-band generator according to the invention is that, if all lines forming the phase-shifters have the same characteristic impedance, the input impedance of the generator is constant.

Of course the invention is not limited to the embodiments described and shown which were given solely by way of example.

What is claimed is:

1. An arrangement for providing a first pair of side-band waves and a second pair of side-band waves corresponding to the amplitude modulations at a frequency F of a wave at a frequency $f$, the modulating signal of said first pair being in quadrature with respect to the modulating signal of said second pair, said arrangement comprising: means for providing high frequency carrier wave energy at said frequency $f$, means for splitting said energy into two equal parts; first and second means for respectively simultaneously and stepwise, phase shifting said energy parts by equal steps of opposite sign, said steps having the same absolute value for both energy parts, said phase shifts reaching the value $2\pi$ within a period T equal to $1/F$, said first and second means having respective outputs; and adding and subtracting means having inputs respectively coupled to said outputs, said adding and subtracting means having a sum and a difference output, each of said phase shifting means comprising transmission line sections of the same impedance in series and means for sequentially switching-in predetermined sections to cause said phase shifting means to provide phase shifts varying according to said steps.

2. An arrangement as claimed in claim 1, wherein said sections being numbered from 1 to N, each section introduces a phase shift equal to $2^{i-1}.q$, $i$ designating the number of the section and $q$ being the phase shift introduced by said section numbered 1, $2^Nq$ being equal to $2\pi$.

3. An arrangement as claimed in claim 2, wherein said sequentially switching means comprise a source of pulses having a repetition frequency equal to $2^N$F, a binary counter for counting said pulses having N first outputs, respectively connected to said sections of one of said phase shifting means and N second outputs respectively connected to said sections of the other phase shifting means in the order named for switching these sections in, said first outputs providing binary digits and said second outputs providing binary digits complementary to said binary digits.

References Cited

UNITED STATES PATENTS 2,951,996 9/1960 Pan ---------------- 333—11X

ROY LAKE, Primary Examiner

L. J. DAHL, Assistant Examiner